United States Patent [19]

Otori et al.

[11] Patent Number: 5,502,976
[45] Date of Patent: Apr. 2, 1996

[54] AIR CONDITIONING APPARATUS

[75] Inventors: Masahiko Otori; Nobusuke Shirakawa; Shotaro Hamamoto; Hirokazu Unno, all of Shizuoka, Japan

[73] Assignee: Kabushiki Kaisha Toshiba, Kawasaki, Japan

[21] Appl. No.: 250,703

[22] Filed: May 26, 1994

[30] Foreign Application Priority Data

May 28, 1993 [JP] Japan .................................. 5-126420

[51] Int. Cl.$^6$ ................................................ F25B 49/02
[52] U.S. Cl. .............................. 62/129; 62/160; 62/158
[58] Field of Search ............................. 62/160, 125, 126, 62/127, 129, 130, 157, 158, 231, 202, 203, 208; 165/11.1

[56] References Cited

U.S. PATENT DOCUMENTS

| | | | |
|---|---|---|---|
| 4,381,549 | 3/1983 | Stamp, Jr. et al. | 165/11.1 X |
| 4,535,598 | 8/1985 | Mount | 62/126 |
| 4,550,770 | 11/1985 | Nussdorfer et al. | 165/29 |
| 4,936,105 | 6/1990 | Takechi et al. | 62/129 |
| 5,115,643 | 5/1992 | Hayata et al. | 62/126 X |
| 5,123,252 | 6/1992 | Hanson | 62/213 X |

FOREIGN PATENT DOCUMENTS 56-16178   4/1984   Japan .

Primary Examiner—Harry B. Tanner
Attorney, Agent, or Firm—Cushman Darby & Cushman

[57] ABSTRACT

The air conditioning apparatus operable in heating and cooling operation modes for air conditioning a room has an external unit, an inner unit, and a control device. The external unit includes an external heat exchanger. The inner unit disposed in the room includes an inner heat exchanger which functions as an evaporator in the cooling operation mode whereas the external heat exchanger functions as a condenser. The control device has a thermistor disposed on the inner heat exchangers for detecting temperature of the inner heat exchanger, bias means for energizing the thermistor with a predetermined bias potential and term setting means responsive to the operation mode for setting first and second terms for allowing the energization of the thermistor. The the first term is longer than the second term when the inner heat exchanger functions as an evaporator. The control device also has a room temperature sensor disposed in the room for detecting room temperature. The thermistor is tentatively energizing in order to detect temperature of the inner heat exchanger when a predetermined period of non-air conditioning operation has elapsed. Both detected temperatures in the non-air conditioning operation period are compared with each other. Malfunction of the thermistor or the room sensor is detected when the difference between two temperatures exceeds a predetermined value.

16 Claims, 8 Drawing Sheets

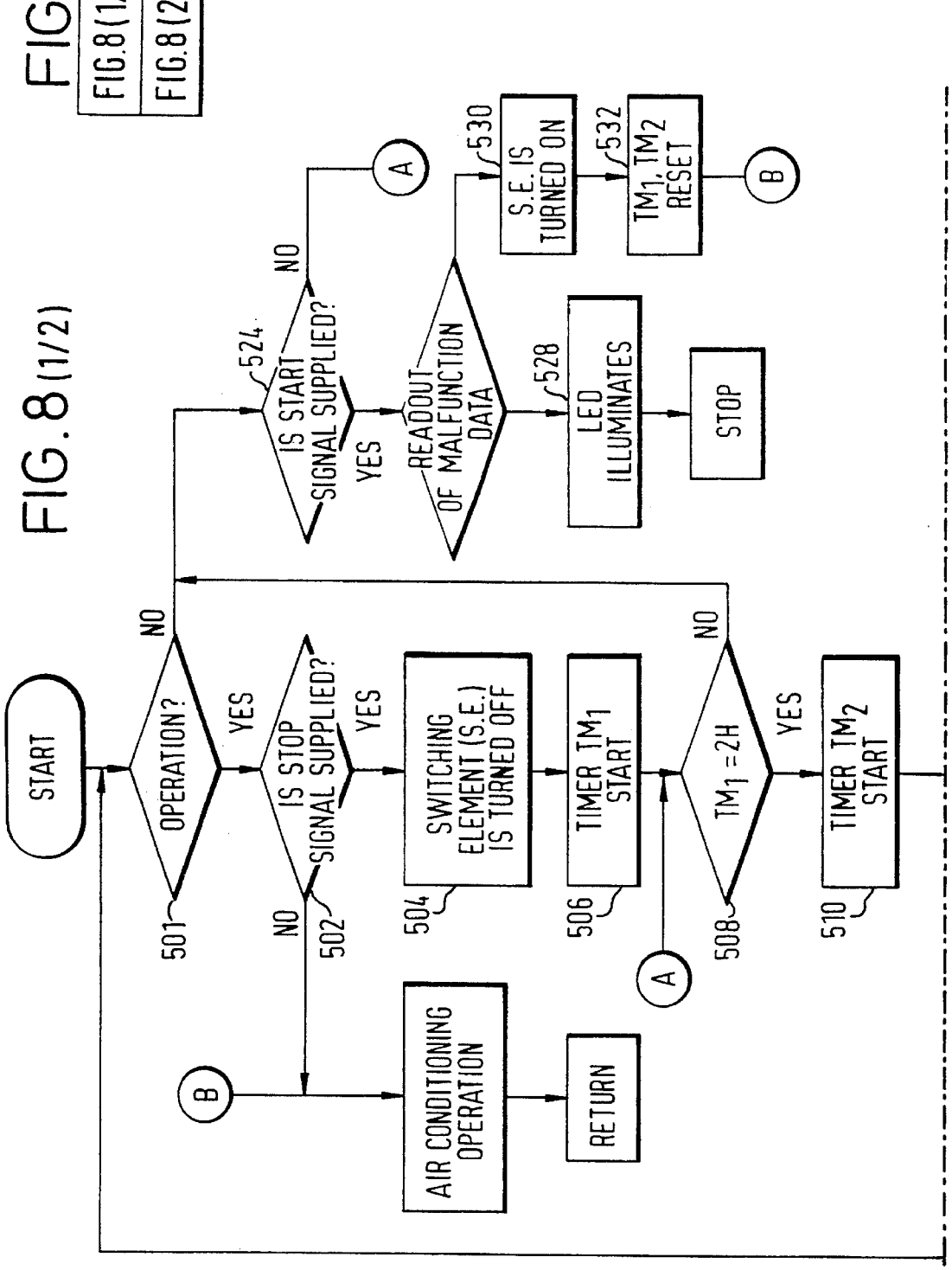

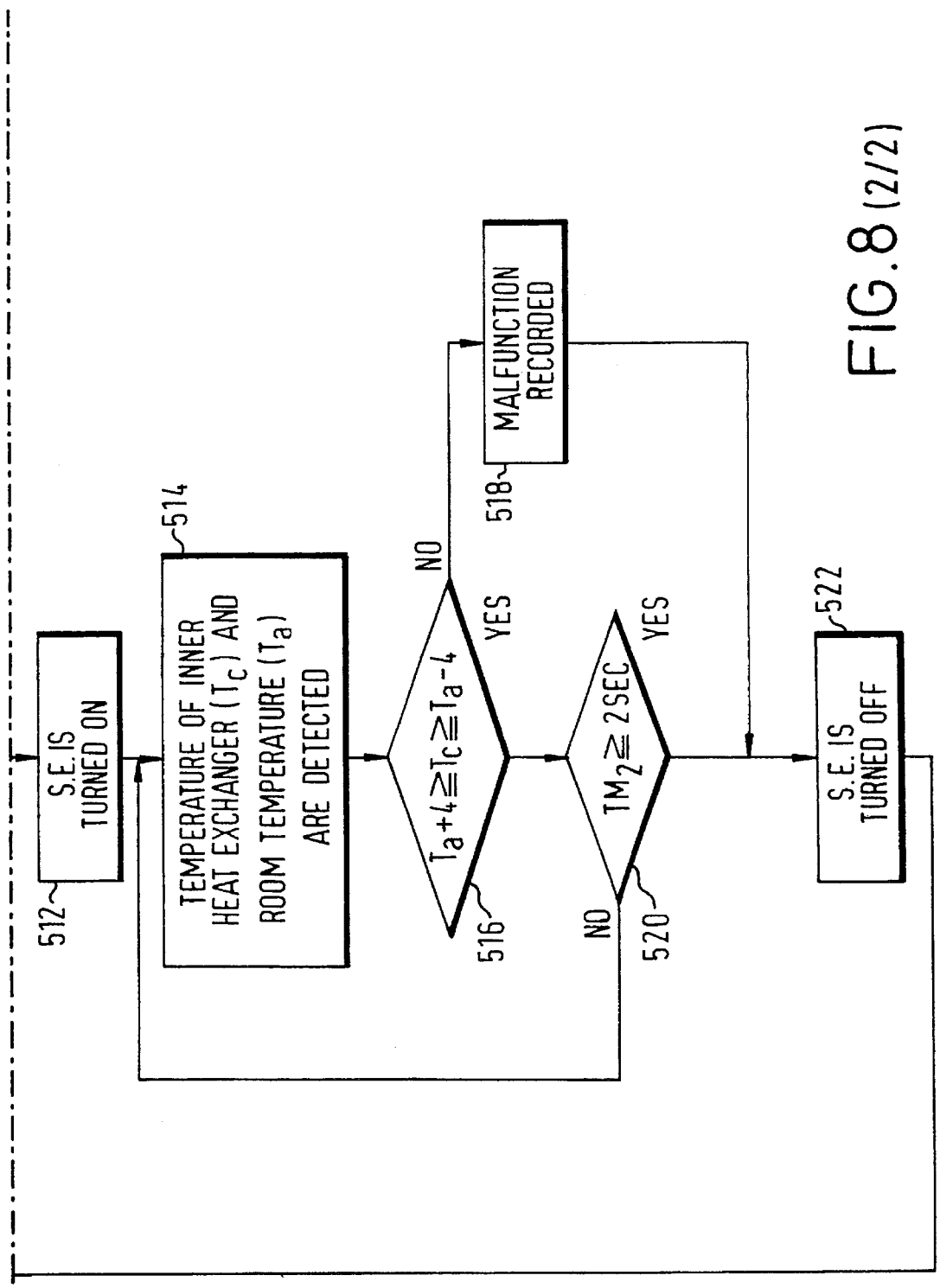
FIG. 8 (2/2)

ents of the invention, and together with the general
AIR CONDITIONING APPARATUS

BACKGROUND OF THE INVENTION

1. Field of the Invention

The present invention relates to an air conditioning apparatus and more particularly to an air conditioning apparatus including a control device for controlling the operation of a sensor used for detecting temperature.

2. Description of the Related Art

An air conditioning apparatus has inner and external heat exchangers which are part of a refrigerating circuit. The air conditioning apparatus is operable both in heating and cooling modes by reversing a flow of refrigerant in the refrigirating circuit. The air conditioning apparatus works in the cooling mode if the inner heat exchanger functions as an evaporator while the external heat exchanger functions as a condenser. Similarly, the air conditioning apparatus works in the heating mode if the inner heat exchanger functions as a condenser while the external heat exchanger functions as an evaporator.

It is known to use various sensors for detecting temperature, humidity or other indexes in the air conditioning apparatus. Usually, a control device is included in the air conditioning apparatus. The control device, which has a microcomputer, is coupled to the sensors to establish thermally comfortable conditions in response to the detecting results of the sensors. An air conditioning apparatus of this type is disclosed in Japanese Patent Disclosure (kokoku) No.59-16178 (Apr. 13, 1984).

A thermistor, which is known to be a resistive circuit component having a high negative temperature coefficient of resistance is widely used to detect temperature. Resistance between two electrodes or terminals of the thermistor decreases as the temperature increases.

In the air conditioning apparatus, a thermistor is disposed adjacent to the heat exchanger for detecting temperature of refrigerant flowing therein. When the heat exchanger operating as an evaporator, dew is deposited each on the surface of the heat exchanger and on the surface of the thermistor. The thermistor is usually molded with a plastic materials as a protective seal. Nevertheless, the dew on the thermistor is penetrates inside the thermistor through the protective seal and reaches to the electrodes the thermistor. The electrodes of the thermistor are formed with silver or metals containing silver, which often causes undesirable effects known as migration of silver. When the migration is occurred, whiskers of silver in the electrodes gradually grow and extend from one electrode to the other electrode. The whiskers then short-circuit the electrodes during the operation of the thermistor. The short-circuit state is partial and tentative in the beginning of the migration, The short state is resolved as long as the whiskers is thin enough to be melt by the short circuit current. The conductivity between electrodes are varied by the development of the whiskers, which results in shifting the temperature coefficient of resistance of the thermistor. It means that the thermistor indicates higher temperature than the actual temperature. The thermistor finally becomes malfunction because of the whiskers, which now causes the fully short-circuit state between the electrodes.

In a conventional air conditioning apparatus, pulses having a pulse width of 50 msec is periodically (20 sec) applied to the thermistor in place of a fixed D.C. potential for avoiding or delaying the migration.

However, there is a problem because the thermistor is not sensitive to a change in temperature due to the long pulse interval. If the thermistor is not sensitive to a change in temperature, particularly when the heat exchanger functions as a condenser, it would fail to take an appropriate action in a short time against the abrupt or abnormal increase of the temperature of the heat exchanger. Further, if the air conditioning apparatus is a type of an air conditioner which has a control device for delaying a fan to start blowing heated air to a room until temperature of the inner heat exchanger becomes predetermined temperature, it would take a time to blow the heated air even the inner heat exchanger becomes the predetermined temperature.

SUMMARY OF THE INVENTION

Accordingly, it is an object of the present invention to provide an air conditioning apparatus which accurately detects temperature of a heat exchanger. It is another object of the present invention to avoid or delay the migration of silver occurred in electrodes of a thermistor used as a temperature sensor. Further object of the present invention is to improve the sensitivity of the temperature detection performance.

To accomplish the above objects, there is provided with an air conditioning apparatus operable in heating and cooling operation modes for air conditioning a given space. The air conditioning apparatus comprises an external unit including a compressor for compressing refrigerant and an external heat exchanger and an inner unit including an inner heat exchanger which functions as a condenser in the heating operation mode whereas the external heat exchanger functions as a condenser. A control device for controlling the air conditioning operation has a thermistor disposed adjacent to one of the heat exchangers for detecting temperature of the one heat exchanger, bias means for energizing the thermistor with a predetermined bias potential and term setting means responsive to the operation mode for setting first and second terms for allowing the energization of the thermistor wherein the first term is longer than the second term when the one heat exchanger functions as an evaporator. A room temperature sensor is disposed in the space for detecting temperature of the space. Means for tentatively energizing the thermistor is provided for detecting temperature of the inner heat exchanger when a predetermined period of non-air conditioning operation has elapsed. Means for comparing the temperature detected by the thermistor with the temperature detected by the sensor is provided, which generates a signal indicative of malfunction of the thermistor or the room sensor when the difference between two detected temperatures exceeds a predetermined value.

BRIEF DESCRIPTION OF THE DRAWINGS

The accompanying drawings, which constitute a part of the specification, illustrate a presently preferred embodiments of the invention, and together with the general description given above and detailed description of the preferred embodiments given below, explain the principles of the present invent ion.

FIG. 8 is a key to the reconstruction of FIGS. 8(1/2) and 8(2/2) which show a program flow chart showing a temperature detecting process of the inner heat exchanger shown in FIG. 5

DETAILED DESCRIPTION OF PREFERRED EMBODIMENTS

An embodiment of the present invention will now be explained with reference to the accompanying drawings.

Figure 1:
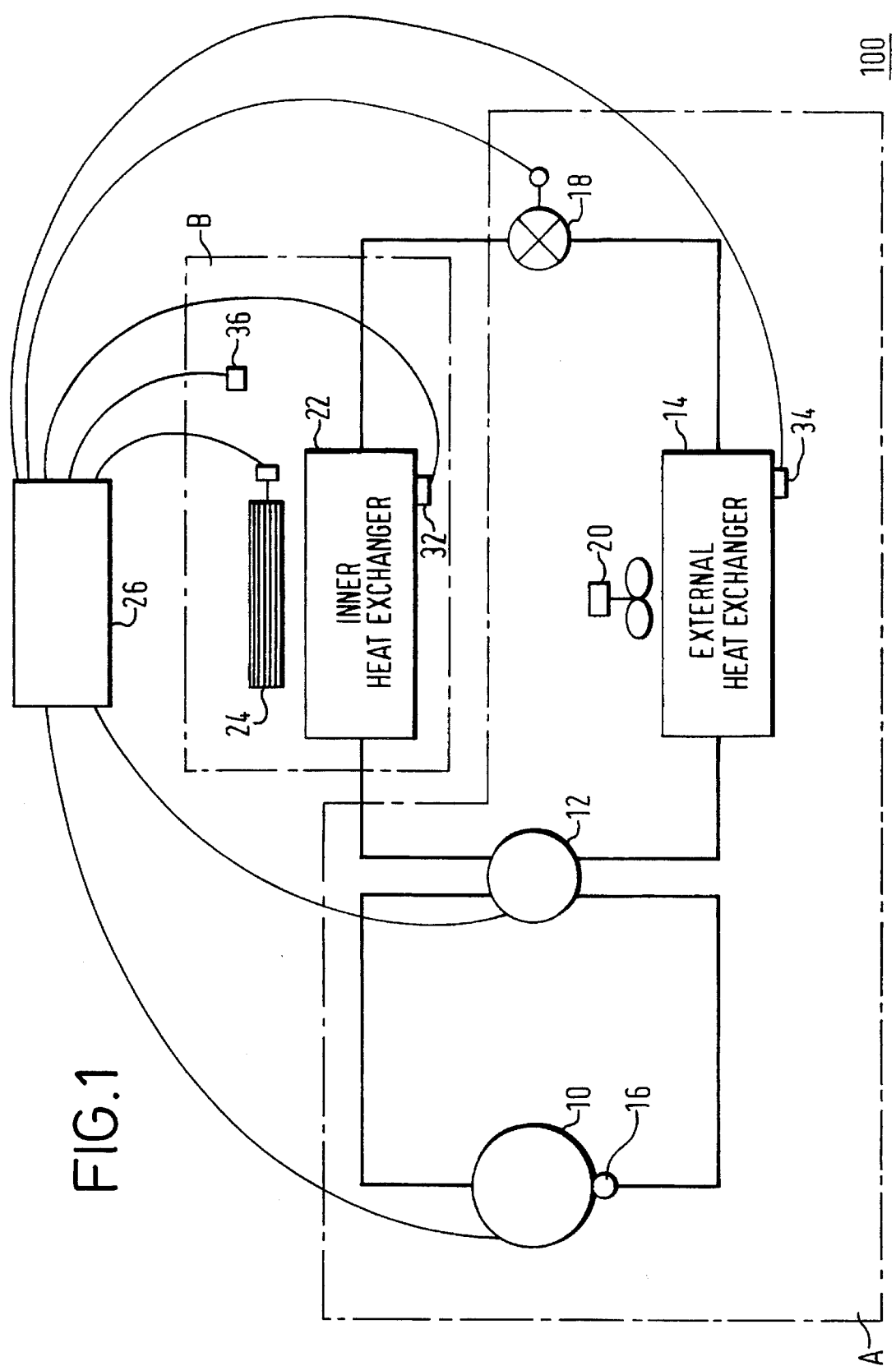
FIG. 1 is a schematic view of an air conditioning apparatus as a first embodiment according to the invention.

FIG. 1 shows a schematic view of an air conditioning apparatus 100 as a first embodiment according to the present invention. Air conditioning apparatus 100 has an external unit A and an in:let unit B. External unit A has a compressor 10, a four-way valve 12, and an external heat exchanger 14. A capacity of compressor 10 is varied and refrigerant is discharged from a discharge port (not shown) to four-way valve 12. Compressor 10 has a suction port (not shown) from which refrigerant is sucked. The suction port is connected to four-way valve 12 through an accumulator 16. One end of external heat exchanger 14 is connected to four-way valve 14 while the other end of heat exchanger 14 is connected to an expansion valve 18. An external fan 20 is disposed adjacent to external heat exchanger 14 to promote hear exchange operation.

Inner unit B has an inner heat exchanger 22. Adjacent to inner heat exchanger 22, an inner fan 24 is disposed to blow air-conditioned air to a room where inner unit B is disposed. One end of inner heat exchanger 22 is connected to four-way valve 12 while the other end is connected to expansion valve 18.

A refrigerant circuit is formed with compressor 10, four-way valve 12, external heat exchanger 14, expansion valve 18 and inner heat exchanger 22. Four-way valve 12 changeovers the operation of air conditioning apparatus 100 to either a cooling mode including deyhumidifying or a heating mode. A flow of the refrigerant in the refrigerant circuit is reversed in general when the mode is changed from one to other. External heat exchanger 14 which functions as a condenser during the cooling mode is connected to four-way valve 12. In the cooling mode, four-way valve 12 is set to a cooling position where the refrigerant from compressor 10 flows to external heat exchanger 14. Liquid refrigerant flowing into inner heat exchanger 22 is evaporated during the cooling mode. Inner heat exchanger 22 thus functions as an evaporator in the cooling mode. The evaporated refrigerant returns to compressor 10 through four-way valve 12 and accumulator 16. When the air conditioning apparatus works in the heating mode, four-way valve 12 is set to a heating position to send the refrigerant from compressor 10 to inner heat exchanger 22 which now functions as a condenser. The refrigerant is so condensed at inner heat exchanger 22 that heat is generated. The heat is dissipated to warm the room. The refrigerant then flows into external heat exchanger 14 through expansion valve 18 and returns to compressor 10 through four-way valve 12 and accumulator 16. In the heating mode, external heat exchanger functions as an evaporator.

Air conditioning apparatus 100 has a control device 26 which is composed of a microcomputer 30, its peripheral circuits and temperature sensors 32, 34, 36. Each sensors 32, 34, 36 are composed of thermistors. Control device 26 controls the operation of compressor 10, four-way valve 12, external and inner fans 20, 24 and expansion valve 28. Control device sets the operating positions of four-way valve 12 in accordance with the selected mode. The operation mode or other setting conditions, such as desired room temperature is set by input means such as a remote controller (not shown). Sensors 32, 34 disposed at inner and external heat exchangers 22, 24 are respectively used to detect temperature of the refrigerant. The flow of the refrigerant in the refrigerant circuit is controlled by control device 26 based on the setting conditions and temperature data obtained by sensors 32, 34, 36.

Figure 2:
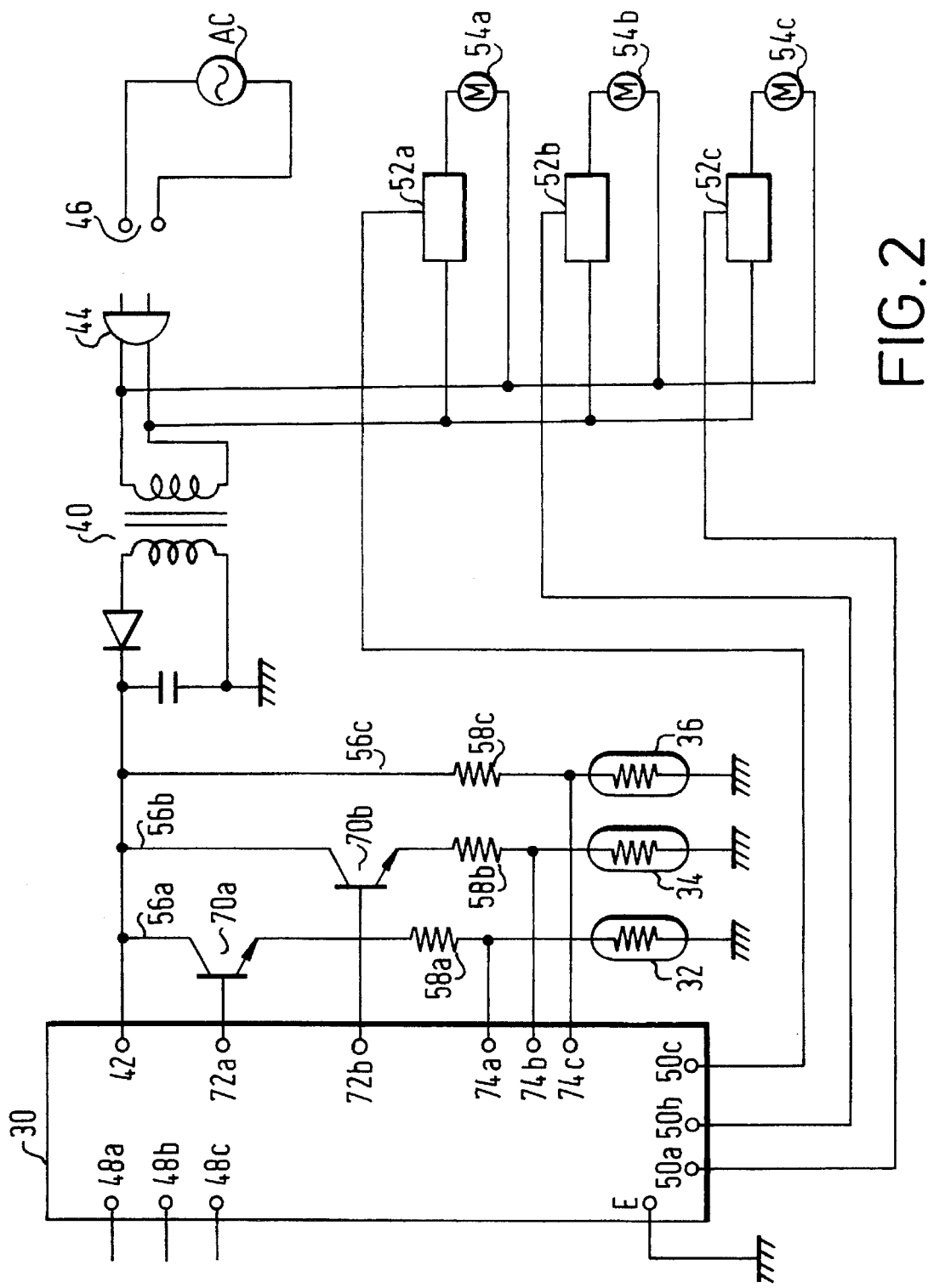
FIG. 2 is an electrical circuit arrangement of the air conditioning apparatus as a first embodiment.

As shown in FIG. 2, control device 26 has a rectifying circuit 40 to convert an A.C. voltage to a D.C. voltage. A terminal 42 of microcomputer 30 is connected to an output terminal of rectifying circuit 40. The D.C. voltage is applied to microcomputer 30 so long as a plug 44 of air conditioning apparatus 100 is connected to an outlet 46. Microcomputer 30 starts its operation by a signal supplied to a terminal 48a from the remote controller as a part of control device 26. The cooling mode is selected by a signal supplied to a terminal 48b while the heating operation mode is selected by a signal supplied to a terminal 48c. Output terminals 50a, 50b, 50c of microcomputer 30 are connected to motor speed controllers 52a, 52b, 52c connected to compressor 10, external fan 20 and inner fan 24, respectively. Numerals 54a, 54b, 54c denote motors for compressor, external fan 14 and inner fan 24, respectively. The output terminal or terminal 42 is connected to three branch circuits 56a, 56b, 56c. Each branch circuit 56a, 56b, 56c has a divider resister 58a, 58b, 58c connected to thermistors 32, 34, 46. A switching transistor 70a is interconnected between terminal 42 and resister 58b. The base of transistor 70a is connected to an output terminal 72a of computer. A switching transistor 70b is interconnected between terminal 42 and resister 58b. The base of transistor 70b is connected to an output terminal 74b of computer 30.

Figure 3A:
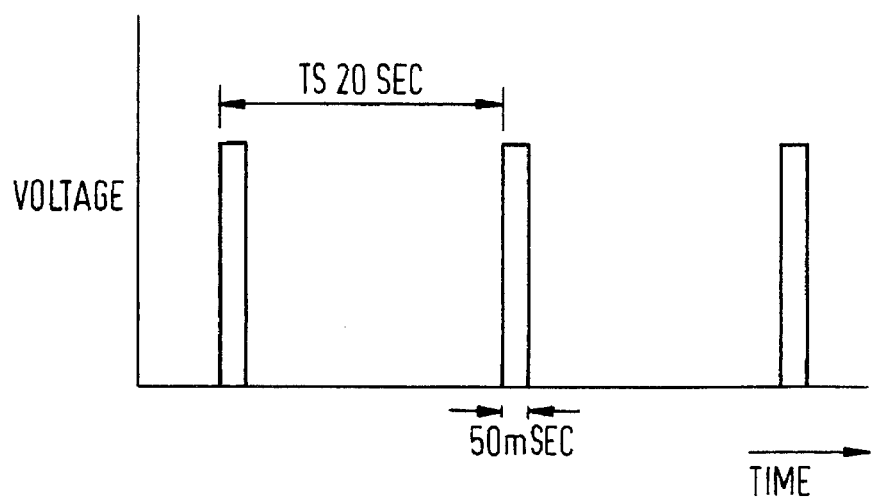
FIGS. 3(a) and 3(b) are graphs illustrating bias pulses supplied to a thermistor disposed on an inner heat exchanger of the air conditioning apparatus.
Figure 3B:
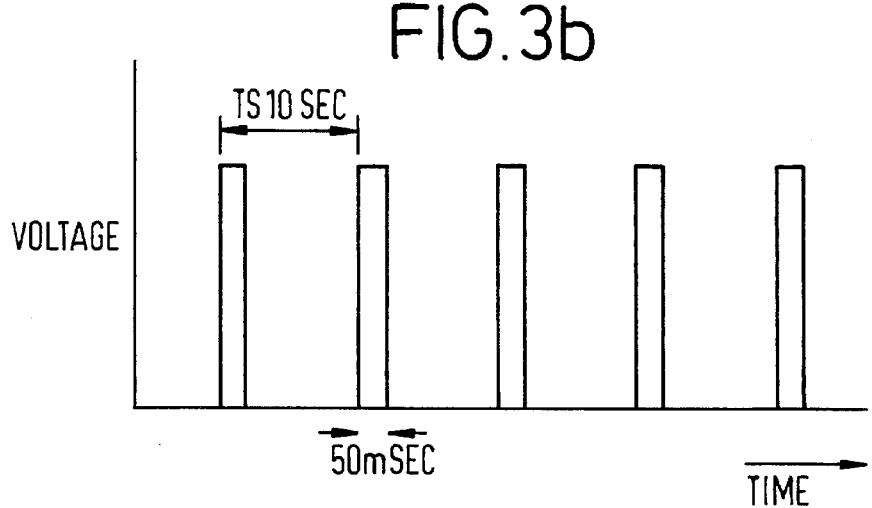

In the cooling mode, transistors 70a, 70b are controlled by control signals S1, S2, supplied from terminals 72d, 72e. An energization of thermistors 32, 34 is respectively controlled by signals S1, S2. On the other hand, thermistor 36 for detecting the room temperature energized so long as the output D.C. voltage is supplied from rectifying circuit 40. In the cooling mode, the signal S1 is supplied to the base of transistor 72a so that thermistor 32 is energized by pulses as shown in FIG. 3(a). A voltage drop caused by thermistor 32, which corresponds to the temperature of inner heat exchanger 22, is derived in every 20 sec and supplied to an terminal 74a of microcomputer 30. Thermistor 32 thus detects the temperature of inner heat exchanger 22. Similarly, in the cooling mode, the signal S2 is supplied to the base of transistor 70b so that thermistor 34 is energized by pulses as shown in FIG. 3(b). A voltage drop caused by thermistor 23, which corresponds to the temperature of external heat exchanger 14, is derived in every 10 sec and supplied to a terminal 74b of microcomputer 30. Thermistor 34 thus detects the temperature of external heat exchanger 14. In response to the detection results of sensors 32, 34, 36, control signals are supplied from the terminals 50a, 50b, 50c to motor speed controllers 52a, 52b, 52c.

Dew tends to be deposited on inner heat exchanger 22 than on external heat exchanger 14 in the cooling mode.

Accordingly, migration of silver is considerable in the cooling mode than in the heating mode. When inner heat exchanger 22 functions as a condenser in the heating mode, thermistor 32 is heated by heat generated by inner heal exchanger. Thermistor 32 results in a low humidity condition, which hardly causes the migration.

In the heating mode, each transistor 70a, 70b is controlled by control signals S3, S4, respectively supplied from terminals 72b, 72a. The signal S3, which is identical to the signal Sl, is supplied to the base of transistor so that thermistor 34 is energized by pulses as shown in FIG. 3(a). The signal S4 is identical to the signal S2 and is supplied to the base of transistor 70a so that thermistor 32 is energized by pulses as shown in FIG. 3(b). External heat exchanger 14 now functions as an evaporator, total on-time of thermistor 33 is then decreased in the heating mode.

Figure 4:
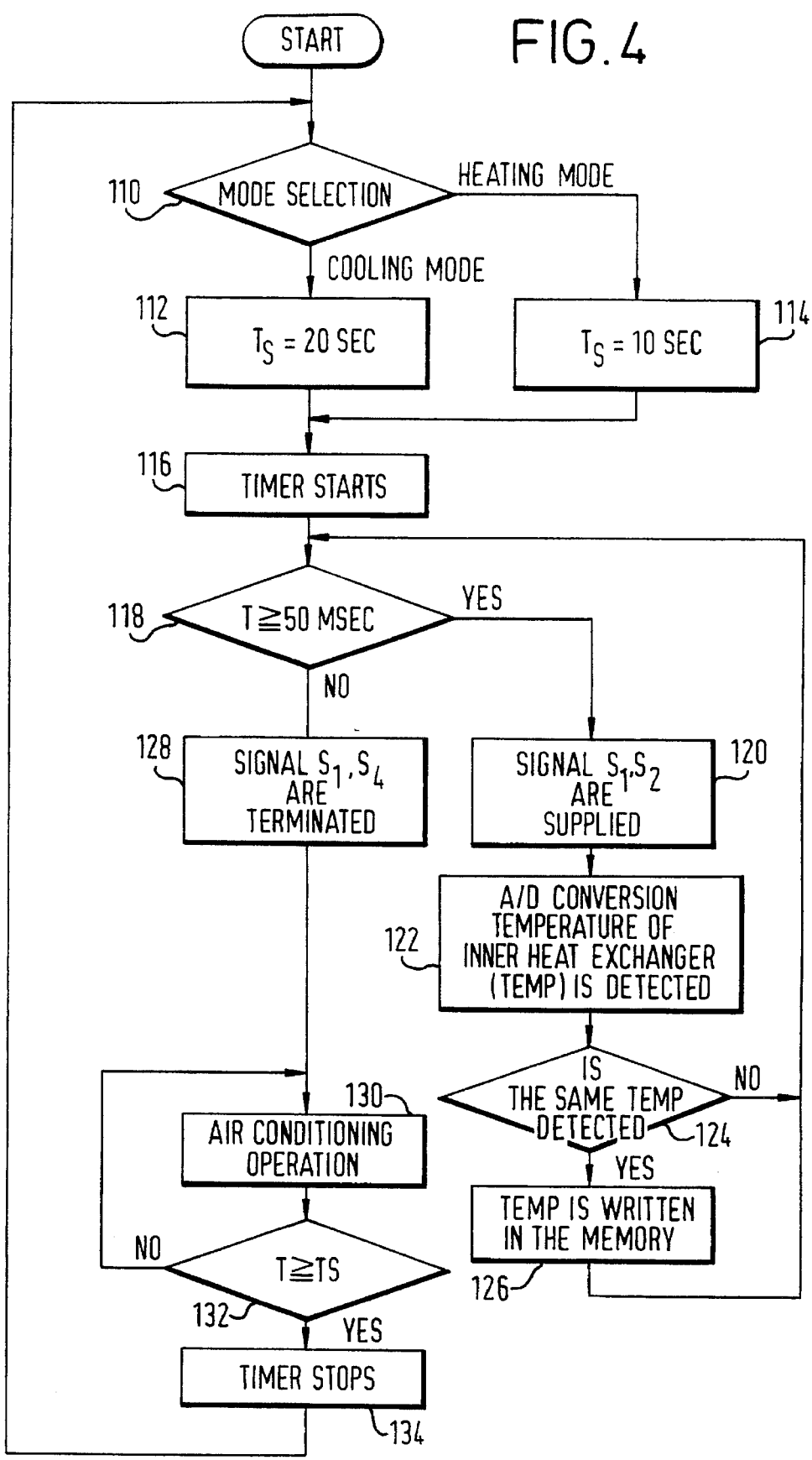
FIG. 4 is a program flow chart showing a temperature detecting process of the inner heat exchanger.

FIG. 4 is a program flow chart showing a temperature detection process for of inner heat exchanger 22. The detection process is programmed in microcomputer 30. If the cooling mode is selected at block 110, Pulse interval Ts of the pulses supplied to thermistor 32 is set to 20 sec (block 112). If the heating mode is selected, pulse interval Ts is set to 10 sec (block 114).

A timer (not shown), which is provided in microcomputer 30, is started at block 116. Inquiry is made at block 118 as to whether the timer counts 50 msec or more, If YES, signal S1 in the cooling mode or signal S4 in the heating mode is supplied from terminal 72a in order to energize thermistor 32 (block 120). The voltage drop caused by thermistor 32 is supplied to microcomputer 30 through terminal 74a as temperature data. The temperature data which is converted to digital data is processed in microcomputer30 and temperature Temp of inner heat exchanger is obtained(block 122). In this embodiment, the detection of the temperature Temp is repeated for the periods of 50 msec. If a predetermined number of the same temperature Temp is detected (block 124), the temperature is read into a memory of microcomputer 30 (block 126).

If NO, at block 118, the supply of signals S1, S4 is terminated (block 128). Air conditioning apparatus 100 performs its operation in the selected mode (block 130). Inquiry is made at block 132 as to whether the timer counts time Ts. If NO, the air conditioning operation is continued. If YES, the timer stops the counting operation and is cleared (block 134). The temperature detection process is returned to block 110.

A temperature detection process for external heat exchanger 14 is substantially the same to the detection process for inner heat exchanger 22 except for signals supplied from terminals 72a. Signals S3, S4 are used in the temperature detection process for external heat exchanger 14 instead of signals S1, S2. In the heating mode, signal S4 is supplied to the base of transistor 72b and the pulse interval Ts is set to 20 sec while in the cooling mode, signal S3 is supplied and pulse interval Ts is set to 10 sec. The detection process for external heat exchanger 14 is programmed in microcomputer 30, however it is substantially the same to the program for detecting temperature of inner heat exchanger 22, therefore, detailed explanations are not provided.

In the first embodiment, an interval of the pulses used for energizing the thermistor 32, which is disposed on the inner heat exchanger, is selected to be longer in the cooling mode than that of the pulses in the heating mode. On the other hand, the interval of pulses used for energizing the thermistor 34 which is disposed on external heat exchanger 14 is selected to be shorter in the cooling mode than that of the pulse in the cooling mode. Accordingly, the migration of silver, which is caused by dew deposited on the inner and external heat exchangers 22, 14 which function as an evaporator, is prevented or delayed. Further, the thermistors 32, 34 used for detecting temperature of the inner heat exchanger 22 or external heat exchanger 14, which function as a condenser, are energized by pulses having a short pulse interval so that the detection sensitivity of the thermistors is improved. Accordingly, protective measures against the abrupt or abnormal temperature increase of the heat exchangers functioning as a condenser can be taken at an early stage.

This invention is applied to an air conditioning apparatus of the type which delays to blow heated air to a room until temperature of the inner heat exchanger becomes predetermined temperature. The improvement of the temperature detection sensitivity enables quick heating of the room because it takes less time to detect the predetermined temperature.

It is necessary to protect an inner heat exchanger from freezing when temperature of the inner heat exchanger in the cooling operation becomes excessively low to freeze the inner heat exchanger. Fortunately, freezing of the heat exchanger is not occurred as soon as the temperature becomes 0° C. It means that a sensor or a thermistor for detecting temperature of the inner heat exchanger in the cooling operation is not required to be sensitive. The operation of the compressor should be stopped when the temperature becomes0° C.

Figure 7:
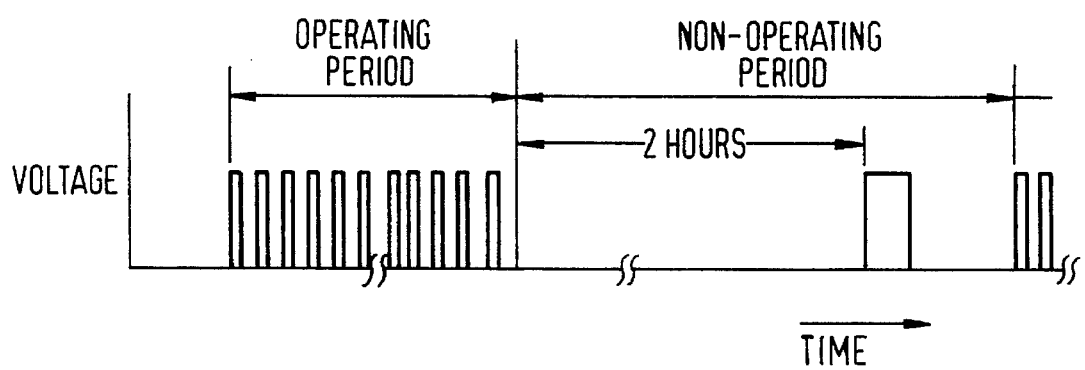
FIG. 7 is graphs illustrating bias pulses supplied to a thermistor disposed on an inner heat exchanger of the air conditioning apparatus shown in FIG. 5.
Figure 5:
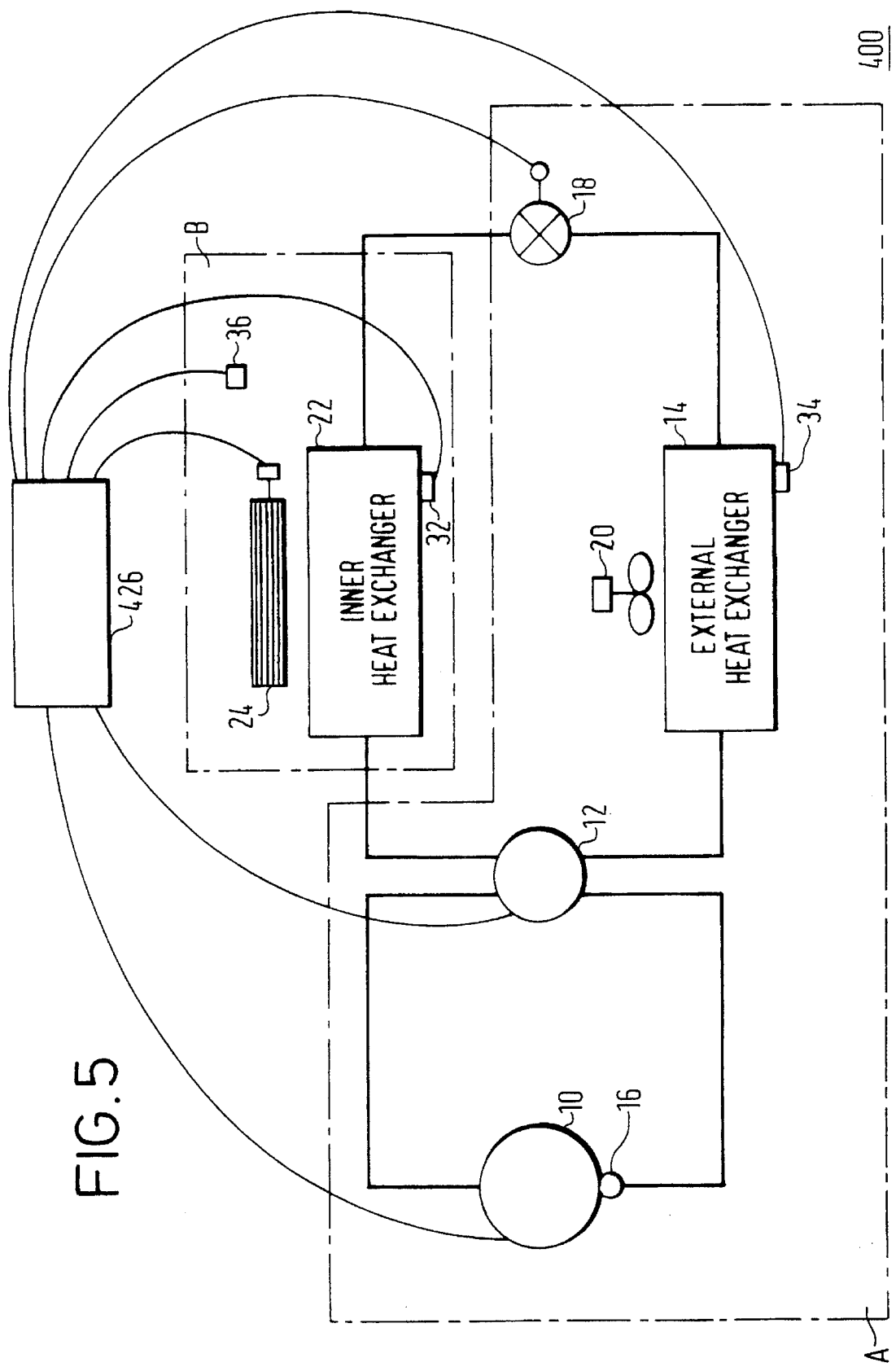
FIG. 5 is a schematic view of an air conditioning apparatus as a second embodiment according to the invention.
Figure 6:
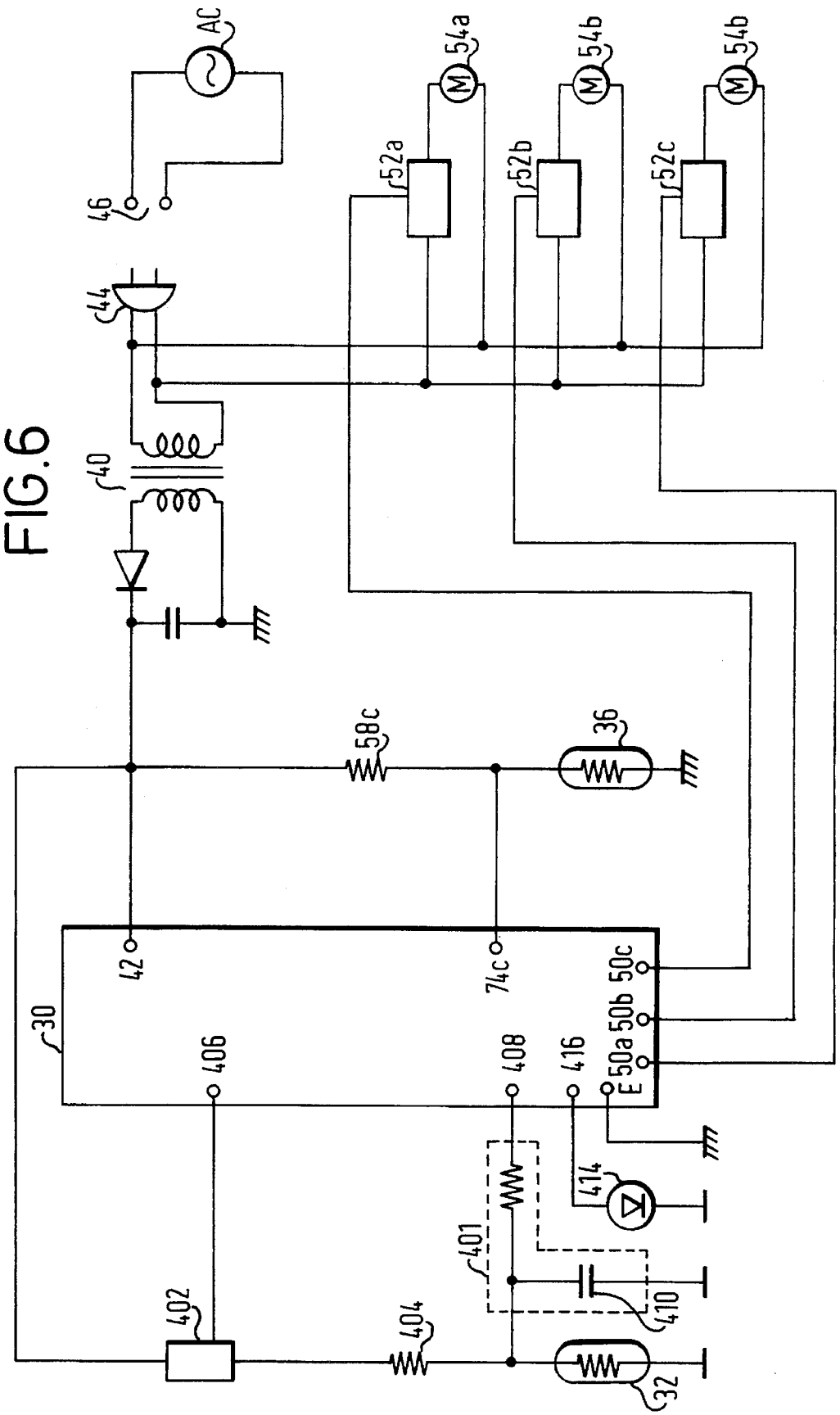
FIG. 6 is an electrical circuit arrangement of the air conditioning apparatus shown in FIG. 5.

A second embodiment in accordance with the present invention is shown in FIGS. 5 to 7 and explained hereunder where like reference characters designate identical or corresponding elements of the above-mentioned first embodiment. However, detailed explanations to those elements are not provided.

FIG. 5 shows a schematic view of an an conditioning apparatus 400 as the second embodiment. Air condition apparatus 400 has a control device 426 which is composed of a microcomputer 30, its peripheral circuits and temperature sensors 32, 24, 36. Sensors 32, 34, 36 are composed of thermistors. As shown in FIG. 6, thermistor 32, which is disposed on an inner heat exchanger 22, is coupled to a RC circuit 401. Thermistor 32 is connected to a switching element 402 through a resister 404. Switching element 402 is controlled by signals S5, S6 supplied from a terminal 406. Either signal S5, S6 is supplied to switching element 402 as long as air conditioning apparatus 400 operates. As show in FIG. 7, pulses are supplied to thermistor 32 wherein a pulse width is 50 msec and a pulse interval Ts is 20 sec in the cooling operation. In the heating operation,the pulse width is 50 msec and the pulse interval Ts is 10 sec. RC circuit 401 is connected to a terminal 408 of microcomputer 30. A capacitor 410 of RC circuit 401 is connected in parallel to thermistor 32. A temperature detection signal by thermistor 32 is supplied to terminal 408. A thermistor 36 for detecting room temperature is energized all the time so long as the output DC voltage is supplied from a rectifying circuit 40. A temperature detection signal by thermistor 36 is supplied to a terminal 74c.

Switching element 402 tentatively becomes conductive state when two hour non-operating condition of air conditioning apparatus 400 has elapsed. Thermistor 32 is then energized in a short period to detect temperature Tc of inner heat exchanger 22. It is experimentally observed that inner heat exchanger 22 has substantially same temperature to the room temperature when the non-operating condition lasts for more than two hours. Based on this observation, malfunction of thermistors 32, 36 is judged by the two temperatures. If there is a temperature difference of more than 4 C. between the two temperatures, microcomputer 30 judges the malfunction of either of thermistors 32, 36. A LED 414 as a warning lamp is connected to a terminal 416, which is lighten when the malfunction is judged.

FIGS. 8(1/2) and 8(2/2) show a program flow chart showing a process for detecting temperature Tc of inner heat exchanger 22 and room temperature. Malfunction of thermistors 32, 36 is judged during the detection process. The detection process is programmed in microcomputer 30. After the program is initiated, inquiry is made at block 501 as to whether air conditioning apparatus 400 is in operating. If YES, the air conditioning operation is continued and next inquiry is made at block 502 as to whether a stop signal for stopping the air conditioning operation is supplied to microcomputer 30. If YES, each operation of compressor 10 and fans 20, 24 is stopped in response to the control signals supplied to motor speed controllers 52a, 52b, 52c. Also, switch element 402 is turned off-state (block 504). If NO path is taken at block 502, the air conditioning operation is continued (block 533) .

A first timer TM1, which is provided in microcomputer 30 is started (block 506). Inquiry is made at block 506 as to whether the non-operating state of air conditioning apparatus 400 lasts for two hours. If YES, a second timer TM2, which is provided in microcomputer 30,is started (block 510). At the same time, a signal S6 is supplied to switching element 402 for energizing thermistor 32 for detecting temperature of inner heat exchanger 22 (512). Thermistor 32 is tentatively energized for a predetermined period. In this embodiment it is chosen to 2 sec. Temperature Tc of inner heat exchanger 22 is then detected. The temperature Tc and room temperature Tr detected by thermistor 32, 36 are supplied to a memory of microcomputer 30 (block 514). The two temperatures Tc, Tr are compared with each other (block 516). If the difference between temperatures Tc, Tr is more than than 4 C., it is judged that either of themistors 32, 36 becomes malfunction. The result of the judgement is recorded into the memory of microcomputer 30 (block 518). Namely, malfunction of thermistors 32, 36 is recorded in the memory. The judgement is carried out within the energization period of thermistor 32. If second timer TM2 counts 2 seconds at block 520, YES path is taken. Switching element 402 is then turned off-state.

If NO path is taken at block 501, inquiry is made at block 524 as to whether a start signal for starting the air conditioning operation is supplied to microcomputer 30. If NO, next inquiry is made at block 508 whereas if YES, inquiry is made at block 526 as to whether malfunction of thermistors 32, 36 is recorded in the memory. If YES, LED illuminates (block 528)and the operation of air conditioning apparatus 400 is not started. If NO path is taken at block 526, either signal S3 or S4 is supplied to switching element 402 for energization of thermistor 32 (block 530). First and second timers TM1, TM2 are reset at block 532. The air conditioning operation is continued (block 533).

No thermistor 34 is involved in the detection process described above, however thermistor 34 is easily involved in the detection process for detecting temperature of the external heat exchanger 14 as well as the judgement of the malfunction of thermistor 34.

As set forth, thermistors disposed on the heat exchangers in this embodiment are energized by the same manner as described in the first embodiment, the migration of silver in the thermistors is prevented or delayed. Further, malfunction of the thermistor, which is disposed the inner heat exchanger, is detected in the second embodiment with the detection process explained above. The detection process also serves to prevent or delay the migration of silver in the thermistor.

Many changes and modifications in the above described embodiments can be carried out without departing from the scope of the general inventive concept as defined by the appended claims and their equivalents.

What is claimed is:

1. An air conditioning apparatus operable in heating and cooling operation modes for air conditioning a given space comprising:

an external unit including a compressor for compressing refrigerant and an external heat exchanger which functions as an evaporator in the heating operation mode and functions as a condenser in the cooling operation mode;

an inner unit including an inner heat exchanger which functions as a condenser in the heating operation mode and functions as an evaporator in the cooling operation mode; and a control device for controlling the air conditioning operation, wherein the control device comprises,
a thermistor disposed adjacent to one of the heat exchangers for detecting temperature of the one heat exchanger,
bias means for energizing the thermistor with a predetermined bias potential; and
term setting means responsive to the operation mode for setting first and second terms for allowing the energization of the thermistor wherein the first term is longer than the second term when the one heat exchanger functions as an evaporator.

2. An air conditioning apparatus according to claim 1, wherein the term setting means includes means for intermittently interrupting the energization of the thermistor.

3. An air conditioning apparatus according to claim 2, wherein the interrupting means includes switch means disposed between the bias means and the thermistor.

4. An air conditioning apparatus according to claim 3, wherein the switch means includes a transistor for periodically supplying pulses having a predetermined pulse width to the thermistor, wherein the pulse period is set longer in the one operation mode whereas the one of heat exchangers functions as an evaporator than in the other operation mode whereas the other heat exchanger functions as a condenser.

5. An air conditioning apparatus operable in heating and cooling operation modes for air conditioning a given space comprising:

an external unit including a compressor for compressing refrigerant and an external heat exchanger which functions as an evaporator in the heating operation mode and functions as a condenser in the cooling operation mode;

an inner unit including an inner heat exchanger which functions as a condenser in the heating operation mode and functions as an evaporator in the cooling operation mode; and a control device for controlling the air conditioning operation, wherein the control device comprises:
a first thermistor disposed adjacent to the inner heat exchanger for detecting temperature of the inner heat exchanger, a first bias means for energizing the first thermistor with a first predetermined bias potential; and a first term setting means responsive to the operation mode for setting a first term for allowing the energization of the first thermistor, wherein the first term is set longer in the cooling mode.

6. An air conditioning apparatus according to claim 5, wherein the control device further comprises a second thermistor disposed adjacent to the external heat exchanger, second bias means for energizing the second thermistor with a second predetermined bias potential and a second term setting means responsive to the operation mode for setting a second term for allowing the energization of the second thermistor wherein the second term is set longer in the heating operation mode.

7. An air conditioning apparatus according to claim 6, wherein the term setting means includes means for intermittently interrupting the energization of the first and second thermistors.

8. An air conditioning apparatus according to claim 7, wherein the interrupting means includes switch means disposed between the first and second bias means and first and second thermistors.

9. An air conditioning apparatus according to claim 8, wherein the switch means includes transistor means for periodically supplying first and second pulses having a predetermined pulse width to the first and second thermistors, respectively wherein the pulse period for the first pulses is set longer in the cooling operation mode than in the heating operation mode and the pulse period for the second pulses is set longer in the heating operation mode than in the cooling mode.

10. An air conditioning apparatus according to claim 1, wherein the control device further comprises:

a room temperature sensor disposed in the space for detecting temperature of the space, means for tentatively energizing the thermistor for detecting temperature of the inner heat exchanger when a predetermined period of non-air conditioning operation has elapsed; and means for comparing the temperature detected by the thermistor with the temperature detected by the room sensor and generating a signal indicative of malfunction of the thermistor or the room sensor when the difference between two temperatures exceeds a predetermined value.

11. An air conditioning apparatus according to claim 10, wherein the control device further comprises means for displaying the malfunction when the signal is generated.

12. An air conditioning apparatus according to claim 11, wherein the control device further comprises means for recording and reading-out the signal.

13. An air conditioning apparatus according to claim 5, wherein the control device further comprises:

a room temperature sensor disposed in the space for detecting temperature of the space, means for tentatively energizing the first thermistor for detecting temperature of the inner heat exchanger when a predetermined period of non-air conditioning operation has elapsed; and means for comparing the temperature detected by the first thermistor with the temperature detected by the room sensor and generating a signal indicative of malfunction of the thermistor or the room sensor when the difference between two temperatures exceeds a predetermined value.

14. An air conditioning apparatus according to claim 13, wherein the control device further comprises means for displaying the malfunction when the signal is generated.

15. An air conditioning apparatus according to claim 14, wherein the control device further comprises means for recording and reading-out the signal.

16. Method of detecting temperature of at least one of inner and external heat exchangers of an air conditioning apparatus with a thermistor disposed adjacent to the one heat exchanger, the air conditioning apparatus being operable in cooling and heating operation modes whereas one heat exchanger functions as an evaporator while the other heat exchanger functions as a condenser, comprising:

intermittently energizing the thermistor with a predetermined bias potential; and setting first and second terms of the intermittent energization to the thermistor, the first term being longer than the second term when the one heat exchanger functions as an evaporator.

* * * * *